United States Patent [19]

Lahcanski et al.

[11] Patent Number: 5,325,232
[45] Date of Patent: Jun. 28, 1994

[54] LENS PROTECTOR DEVICE

[75] Inventors: Tomi Lahcanski, Rochester; Frederick J. Schwab, Churchville; Douglas J. Pfaff, Rochester, all of N.Y.

[73] Assignee: Eastman Kodak Company, Rochester, N.Y.

[21] Appl. No.: 943,424

[22] Filed: Sep. 14, 1992

[51] Int. Cl.$^5$ .............................................. G02B 21/26
[52] U.S. Cl. ................................. 359/391; 359/507; 359/511; 359/827; 359/818; 359/813
[58] Field of Search ............... 359/503, 507, 511, 827, 359/818, 809, 813, 811, 391

[56] References Cited

U.S. PATENT DOCUMENTS

| | | | |
|---|---|---|---|
| 3,738,730 | 6/1973 | Binnings et al. | 359/391 |
| 4,501,495 | 2/1985 | Faulkner et al. | 359/391 |
| 4,564,270 | 1/1986 | Willie | 359/511 |

FOREIGN PATENT DOCUMENTS 60-172011  9/1985  Japan ........................... G03B 17/12

OTHER PUBLICATIONS

Patent Abstracts of Japan, vol. 10. No. 19 (p-423) (2076) Jan. 24, 1986.

Primary Examiner—Scott J. Sugarman
Assistant Examiner—Thomas Robbins
Attorney, Agent, or Firm—Edward Dugas

[57] ABSTRACT

A protection device for a lens used in a scanning apparatus for imaging data on photographic film, comprises a plate and having a finger gripping portion, a member slidably retained in the plate, a glass piece removably carried by the member, and a biasing member operatively associated with the member for selectively permitting secure holding of the glass piece on the member and easy removal of the glass piece from the member. The plate is provided with a biasing device for securely retaining the member in a desired location such that the glass piece is in a predetermined lens protecting position. A switch is associated with the plate such that the switch is moved to an open position upon movement of the member away from the plate. The biasing member is a pivotally mounted spring configured to hold the glass piece in a desired location on the member and has V-shaped portions to engage portions of the member for positive locking of the spring in the member.

15 Claims, 5 Drawing Sheets

LENS PROTECTOR DEVICE

TECHNICAL FIELD

The present invention relates to a lens cover or protector, and, more particularly, to a protector for use in a photographic negative film scanning apparatus in which the scanning lens is vertically oriented and prone to having dust and dirt settle thereon.

BACKGROUND ART

In the past, to the extent that lenses in photographic scanning apparatuses used protective covers at all, the covers were attached directly to the lens casing. This is particular problem in a scanning apparatus where the various components fit closely together and access thereto is not convenient. Moreover, it is relatively cumbersome process to remove a lens protector or cover in such a system, and this becomes a serious problem when the frequency of cleaning or replacement of the lens cover is fairly frequent. Consequently, the removal of the lens cover can also result in damage to other sensitive components.

DISCLOSURE OF INVENTION

It is an object of the present invention to provide a lens protector which can be changed easily fairly frequently, without concern about damage to other system components.

It is another object of the present invention to provide a lens protector which makes it extremely easy for the scanning apparatus operator to utilize by providing a lens protector case attached permanently to the chassis or frame and spaced closely to the lens of an imager unit, and a slide member which can be pulled from the casing to remove the cover for cleaning or replacement. The optical lens cover itself is maintained securely in the slide member by a spring biased clamping arrangement which facilitates easy removability of the lens cover but securely and accurately holds the lens cover in the appropriate position when the scanning apparatus is in operation.

BRIEF DESCRIPTION OF DRAWINGS

These and other features, objects and advantages of the present invention will become more apparent from the following detailed description of currently contemplated modes of a lens protector device when taken in conjunction with the accompanying drawings wherein.

MODES FOR CARRYING OUT THE INVENTION

Figure 1:
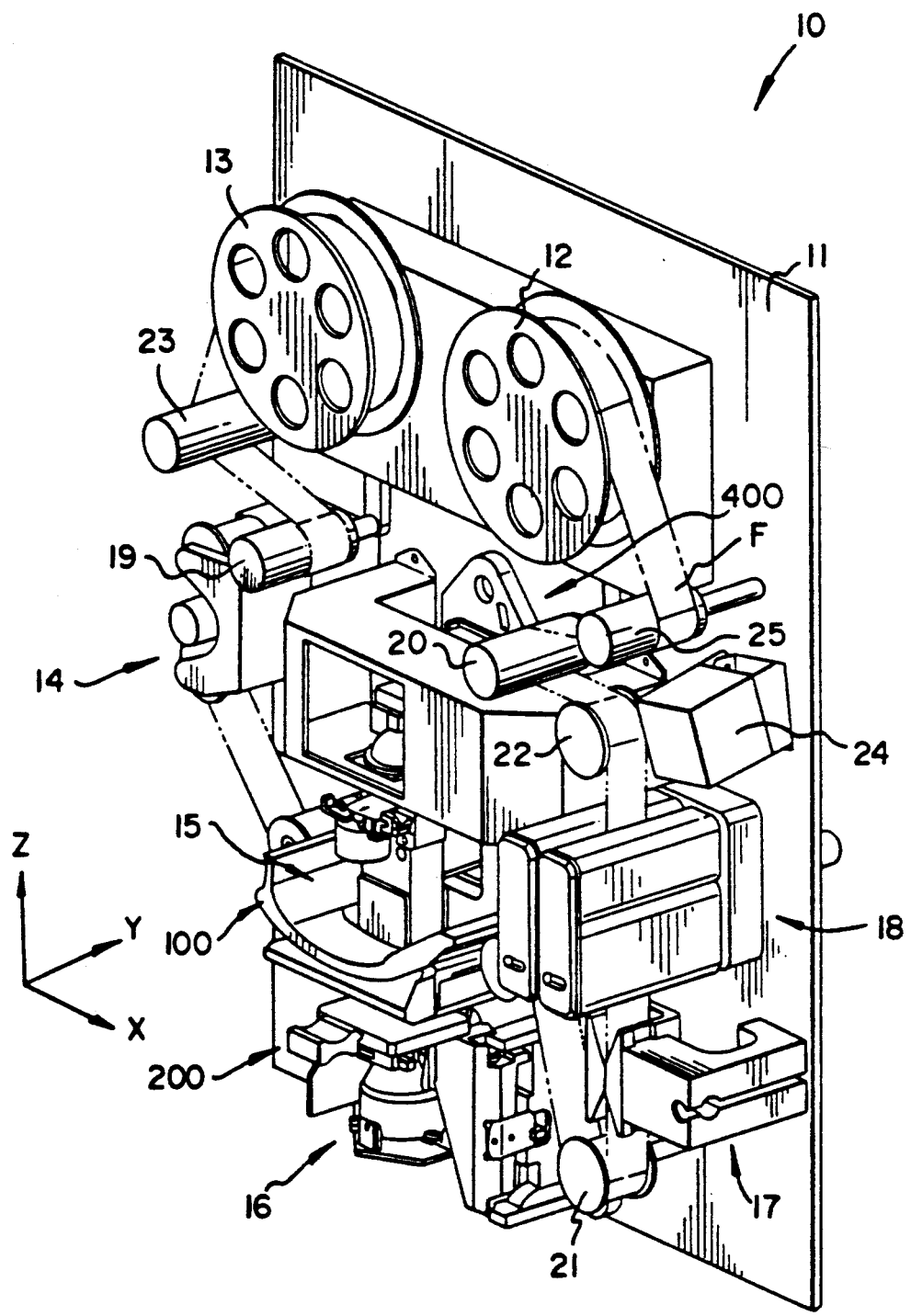
FIG. 1 is a perspective view of the front of a scanning apparatus for use with photographic film in which the lens protector is shown between an imaging unit and a pendulum-like gate.
Figure 2:
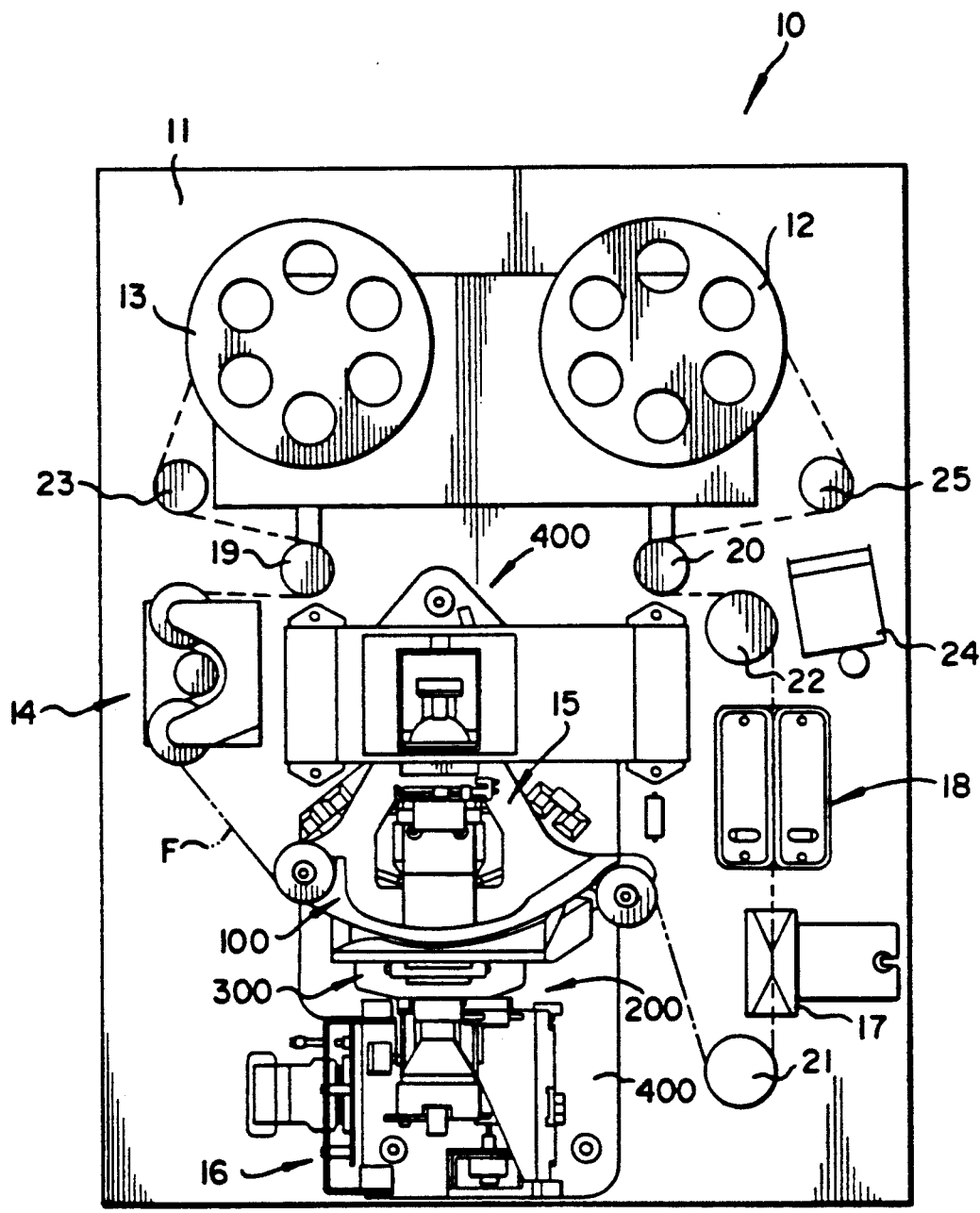
FIG. 2 is a front elevational view of the scanning apparatus shown in FIG. 1.

Referring now to the drawings and, in particular, to FIGS. 1 and 2, a photographic negative film scanning apparatus for scanning and digitizing images on frames of the film is designated generally by the numeral 10. The apparatus 10 includes a board 11 on which are mounted conventional film transport reels 12, 13, a capstan drive 14, an integrating cavity 15, a conventional imager with imaging board designated generally by the numeral 16, a DX bar code reader 17 for determining the type of film being scanned, a film cleaning apparatus 18, a bar code reader 24 for reading order processing data, and spring-biased tension rollers 19, 20 to maintain the film at a substantially constant tension during the high resolution scanning pass. In addition, other idler rollers 21, 22, 23 and 25 are mounted on the board 11 to maintain a smooth but tight path for the film F shown in long and short dash lines. A gate 100 mounted on an optical chassis 400, is rotated, during the high resolution scanning pass in an arc of about $6\frac{1}{2}°$ on both sides of a vertical axis constituting an initializing position in which the gate assumes during the low resolution operation.

The optical chassis 400 is described in co-pending application Ser. No. 943,426, entitled OPTICAL CHASSIS, filed in the names of Eric P. Hochreiter, et al. on Sep. 14, 1992. The film F which is supplied from reel 12 shown in FIGS. 1 and 2 is advanced by the capstan mechanism 14 by pulling the film F from the supply reel 12 over the gate 100 and onto the take-up reel 13. It will be understood, of course, that the capstan mechanism 14 can be disposed on the right-hand side of the scanning apparatus to push the film F over the gate 100 without departing from the scope of the present invention. Inasmuch as the details of the optical chassis 400 are not necessary for an understanding of the present invention, further details with respect thereto are dispensed with and the contents of the application are incorporated by reference herein for background as to the overall construction of the scanning apparatus.

Figure 3:
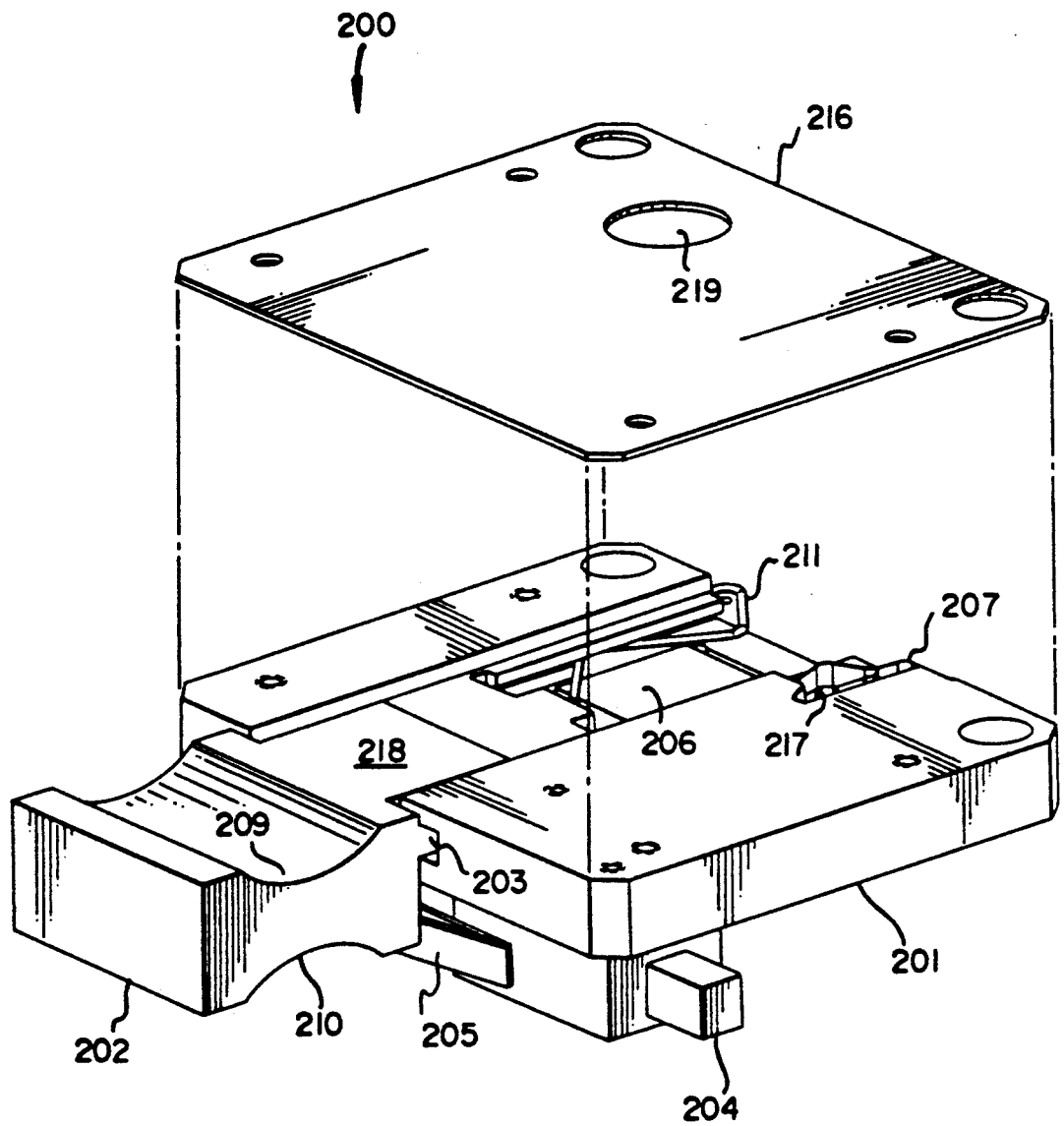
FIG. 3 is a perspective exploded view of the lens protector shown generally in FIGS. 1 and 2.
Figure 7:
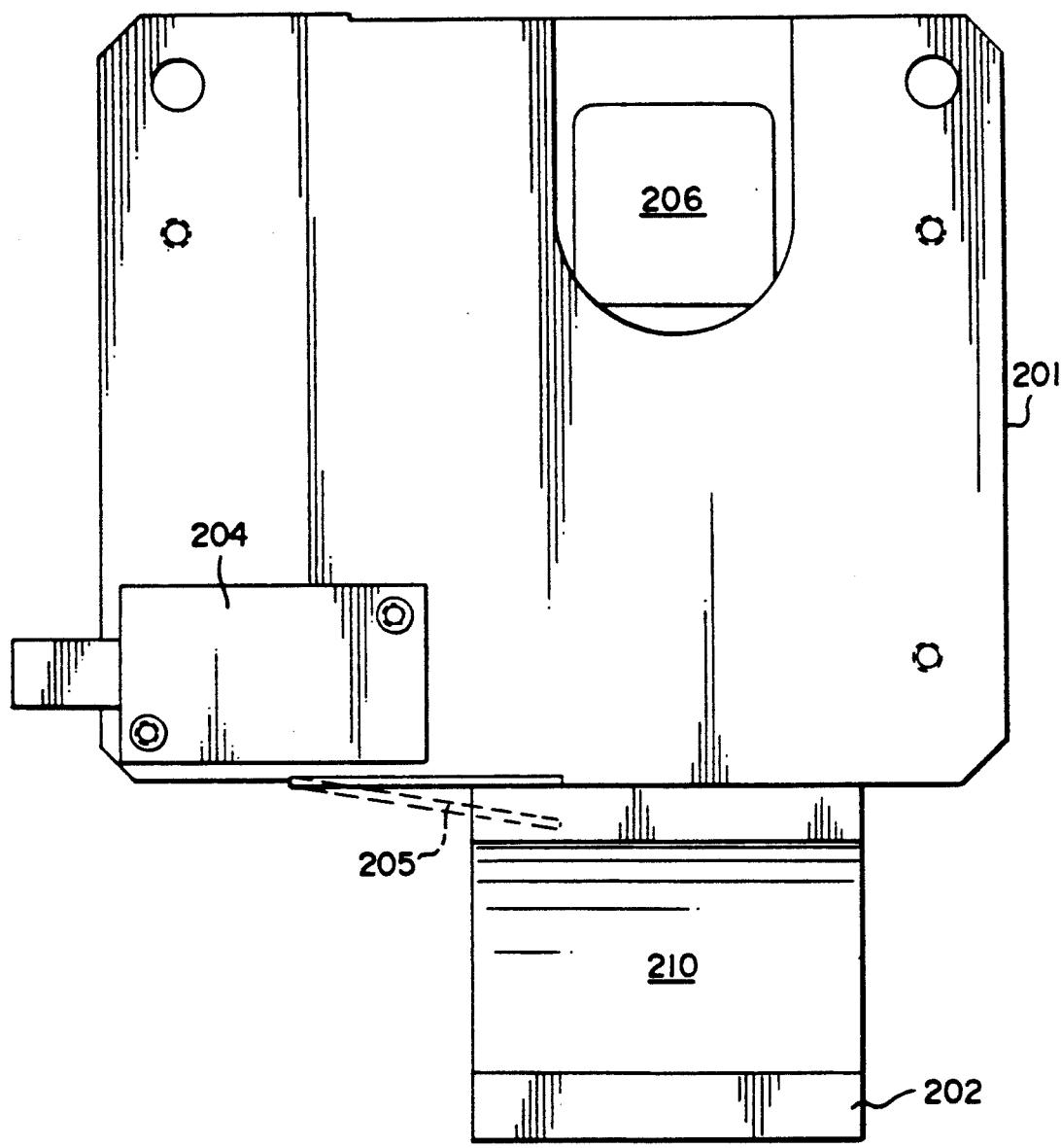
FIG. 7 is a bottom plan view of the lens protector device showing the arrangement of the switch relative to a slide member which shuts off the scanning apparatus when the slide is removed for cleaning or replacement of the optical glass.

Referring now to FIG. 3, the lens protector device is designated generally by the numeral 200 and comprises a slide mount plate 201 in which an imager cover slide member 202 is slidably arranged in channels 203 provided in the mount plate 201 to permit the slide member 202 to be selectively inserted into and removed from the mount plate 201. A switch is provided on the bottom of the plate. The switch has a spring arm 205 which is closed when the slide member 202 is inserted all the way into the plate so as to place an optical glass lens cover 206 over and in close proximity to the lens of the imaging unit 16 as seen in FIG. 1. As can be seen more clearly in FIG. 7, the arm 205 is flush with the wall of the mount plate 201, as shown in solid line, when the slide has been fully inserted into the plate so that the switch connects the scanning apparatus 10 to the power supply to render the apparatus operational. When the slide has been pulled away from the plate sufficiently (just a short distance as shown by the long and short dashed line in FIG. 7), the power supply is interrupted so that the scanning apparatus 10 is shut off as a safety feature for the lab operator.

Figure 4:
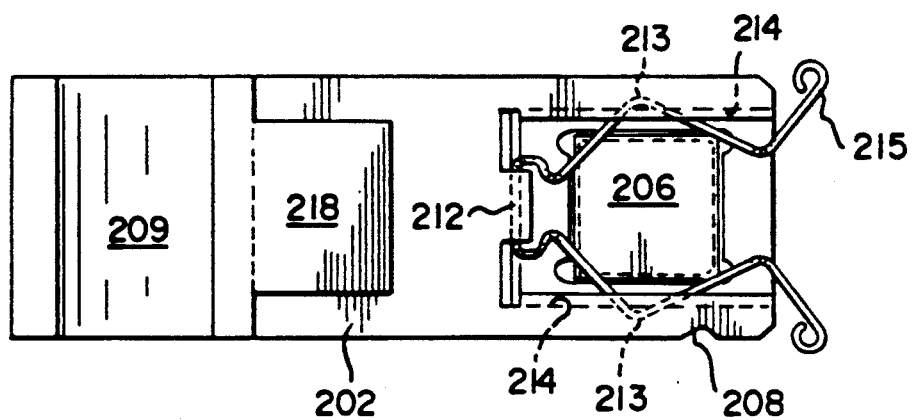
FIG. 4 is a top plane view of the slide used in the lens protector.
Figure 5:
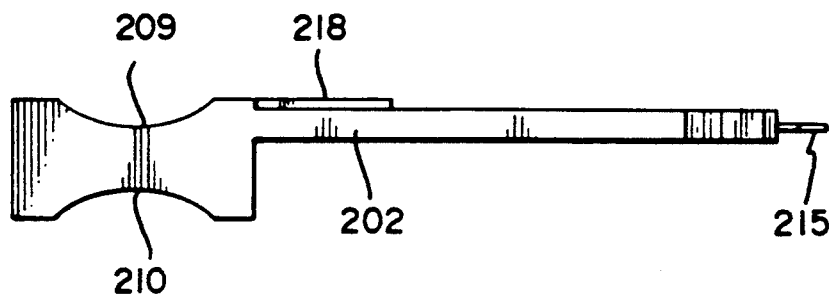
FIG. 5 is a side elevational view of the slide shown in FIG. 4.

To retain the glass cover 206 in a precise position over the lens of the imaging unit 16, a detent is formed using a slide retainer spring 207 provided in the mount plate 201 to engage in a notch 208 (FIG. 4) arranged at an edge of the slide member 202 near its forward free end. The slide member can be provided with an enlarged end having recessed portions 209, 210 on the respective upper and lower surfaces to allow the fingers of the scanning apparatus operator to more easily grasp the slide member 202 for pulling it out from the plate 201 (seen more clearly in FIG. 5).

Figure 6:
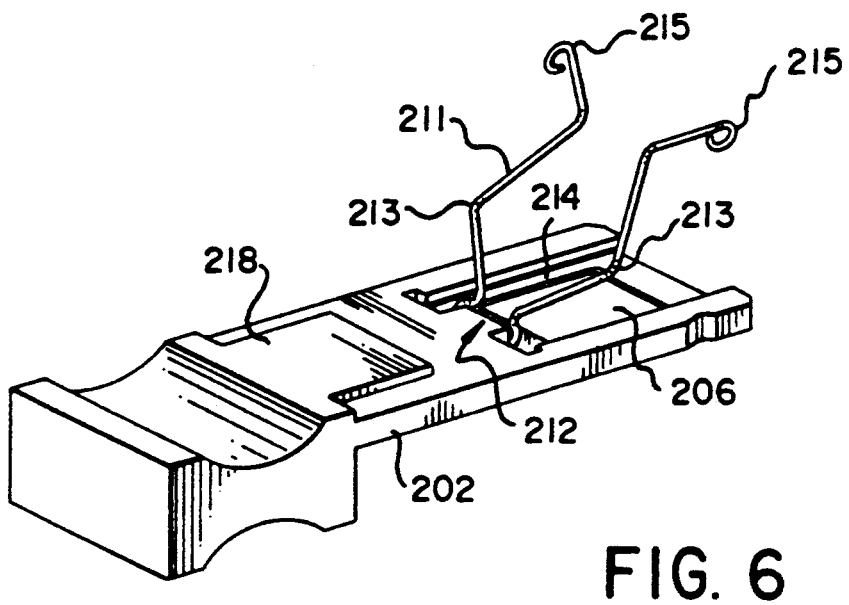
FIG. 6 is a perspective view of the slide shown in FIGS. 4 and 5 with the lens retainer in the released position so that the optical glass lens cover can be removed.

A glass cover retainer spring 211 having a bight portion 212 held in a pivoting manner on the slide member 202 is provided with a V-shaped portions 213 on each side of the spring 211 to engage under channels 214 provided in the slide 202 as shown most clearly in FIG. 3. A portion of the spring 211 extends beyond the free end of the side of the slide 202 so that, after removal of the slide 202 from the mount plate 201 and shutting down of the scanning apparatus 10, the operator can grasp both end portions 215 and squeeze them toward one another to extract the spring 211 from the channels 214. The operator pinches the two end portions 215 together against the bias of the spring 211 and moves the spring 211 to the position shown in FIG. 6. This allows the glass cover 206 which is shown to be of roughly square shape sitting in a recessed area of the slide member 202 for precise and quick location of the lens cover to be replaced or removed for cleaning.

The arrangement of the lens protector device 200 is particularly attractive in the scanning apparatus in which the imaging unit 16 presents a vertically oriented lens where dust and dirt more easily settle on the lens. The mount plate 201 can be mounted to the optical chassis 400 so as to be 0.015 to 0.020 inch from the lens.

A shield plate 216 can be used with the lens protector device 200. The shield plate 216 has an aperture 219 sized to serve as a light baffle that eliminates stray light from entering the imaging lens in the imaging unit 16. With the use of such a plate, the configuration of the slide mount plate 201 can be simplified by eliminating the channels 203 and by avoiding the need for a notch 217 to hold the slide retainer spring 207 in the mount plate 201. In other words, the construction of the slide mount plate can be greatly simplified with the use of a top plate 216.

The slide member 202 can also be provided with a region 218 on its top or bottom surface to assure that the slide member will be installed in the mount plate 201 in the correct orientation.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A protection device for a lens, comprising a plate, a member slidably retained in said plate, a switch associated with the plate such that the switch is moved to an open position upon movement of the member away from the plate, a glass piece removably carried by the member, and a biasing device operatively associated with the member for selectively permitting secure holding of the glass piece on the member and easy removal of the glass piece from the member.

2. The device according to claim 1, wherein the plate is provided with a detent means for securely retaining the member in a desired location such that the glass piece is in a predetermined lens protecting position.

3. The device according to claim 1, wherein the member is provided with at least one gripping portion.

4. The device according to claim 1, wherein the biasing device is a pivotally mounted spring configured to hold the glass piece in a desired location on the member and has V-shaped portions to engage portions of the member for positive locking of the spring in the member.

5. The protected device according to claim 1, wherein the glass piece is optical glass.

6. A protection device for a lens, comprising a plate, means for providing a light baffle associated with said plate, a member slidably retained in said plate, a glass piece removably carried by the member, and a biasing device operatively associated with the member for selectively permitting secure holding of the glass piece on the member and easy removal of the glass piece from the member.

7. In a scanning apparatus having a lens for receiving image data on a photographic film, the improvement comprising a device for protecting the lens, wherein the device includes a plate operatively mounted at the apparatus, a member slidably retained in said plate, a switch associated with the plate such that the switch is moved to an open position upon movement of the member away from the plate, a glass piece removably carried by the member, and a biasing device operatively associated with the member for selectively permitting secure holding of the glass piece on the member and easy removal of the glass piece from the member.

8. In the scanning apparatus according to claim 7, wherein the plate is provided with a detent means for securely retaining the member in a desired location such that the glass piece is in a predetermined lens protecting position a short distance from the lens.

9. In the scanning apparatus according to claim 7, wherein the member is provided with at least one gripping portion.

10. In the scanning apparatus according to claim 7, wherein the biasing device is a pivotally mounted spring configured to hold the glass piece in a desired location on the member and has V-shaped portions to engage portions of the member for positive locking of the spring in the member.

11. In the scanning apparatus according to claim 7, wherein the glass piece is optical glass.

12. In a scanning apparatus having a lens for receiving image data on a photographic film, the improvement comprising a device for protecting the lens, wherein the device includes a plate operatively mounted at the apparatus, a means for providing a light baffle is associated with the plate, a member slidably retained in said plate, a glass piece removably carried by the member, and a biasing device operatively associated with the member for selectively permitting secure holding of the glass piece on the member and easy removal of the glass piece from the member.

13. In the scanning apparatus according to claim 12, wherein the member is provided with at least one gripping portion.

14. In the scanning apparatus according to claim 12, wherein a switch is associated with the plate such that the switch is moved to an open position upon movement of the member away from the plate.

15. In the scanning apparatus according to claim 12, wherein the biasing device is a pivotally mounted spring configured to hold the glass piece in a desired location on the member and has V-shaped portions to engage portions of the member for positive locking of the spring in the member.

* * * * *